United States Patent
Olivier et al.

(10) Patent No.: US 10,805,506 B2
(45) Date of Patent: Oct. 13, 2020

(54) METHOD AND APPARATUS FOR ENCODING COLOR MAPPING INFORMATION AND PROCESSING PICTURES BASED ON COLOR MAPPING INFORMATION

(71) Applicant: THOMSON LICENSING, Issy-les-Moulineaux (FR)

(72) Inventors: Yannick Olivier, Cesson-Sevigne (FR); Sébastien Lasserre, Cesson-Sevigne (FR); Pierre Andrivon, Cesson-Sevigne (FR); Philippe Bordes, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 98 days.

(21) Appl. No.: 15/549,187

(22) PCT Filed: Feb. 19, 2016

(86) PCT No.: PCT/EP2016/053585
§ 371 (c)(1),
(2) Date: Aug. 7, 2017

(87) PCT Pub. No.: WO2016/131970
PCT Pub. Date: Aug. 25, 2016

(65) Prior Publication Data
US 2018/0035015 A1    Feb. 1, 2018

(30) Foreign Application Priority Data

Feb. 20, 2015    (EP) ..................................... 15305266

(51) Int. Cl.
*H04N 1/60*    (2006.01)
*H04N 19/46*    (2014.01)

(52) U.S. Cl.
CPC ......... *H04N 1/6063* (2013.01); *H04N 1/6025* (2013.01); *H04N 19/46* (2014.11)

(58) Field of Classification Search
CPC ..... H04N 1/6025; H04N 1/6063; H04N 19/46
See application file for complete search history.

(56) References Cited

U.S. PATENT DOCUMENTS 5,642,137 A    6/1997    Kitazumi
5,835,099 A *  11/1998    Marimont ............. G06T 11/001
                                                                       345/591
(Continued)

FOREIGN PATENT DOCUMENTS

EP    0491565    6/1992
EP    1638312    3/2006
(Continued)

OTHER PUBLICATIONS

International Search Report of PCT/EP2016/053585 dated May 10, 2016.

*Primary Examiner* — Edward Park
(74) *Attorney, Agent, or Firm* — Xiaoan Lu

(57) ABSTRACT

Color mapping information can be used to transform one color to another color. The present embodiments provide a solution for representing the color mapping information using a successive application of multiple color mapping functions. Parameters for the multiple color mapping functions can be encoded into a bitstream. In one embodiment, color mapping functions are consecutively applied on their own domains of definition only. In another embodiment, the first color mapping (CRI1) is applied on its domain of definition only, but the second color mapping is applied only on samples that have been previously color mapped by CRI1 and which are also inside the domain of definition of the second color mapping function. At the decode side, the (Continued)

multiple color mapping functions can be reconstructed and successively applied to a decoded picture to generate another picture.

20 Claims, 7 Drawing Sheets

(56) References Cited

U.S. PATENT DOCUMENTS

| | | |
|---|---|---|
| 6,781,593 B1 | 8/2004 | Couwenberg et al. |
| 7,167,277 B2 | 1/2007 | Shimizu et al. |
| 7,573,620 B2 | 8/2009 | Presley et al. |
| 7,809,187 B2 | 10/2010 | Shimbaru et al. |
| 8,743,436 B2 | 6/2014 | Kano |
| 2014/0328530 A1 * | 11/2014 | Lee .................. G06T 19/20 382/131 |

FOREIGN PATENT DOCUMENTS

| | | |
|---|---|---|
| EP | 1638312 A2 * | 3/2006 |
| JP | 3223512 | 10/1991 |
| WO | WO 2010/105036 A1 * | 9/2010 |
| WO | WO2010105036 | 9/2010 |
| WO | WO2012125802 | 9/2012 |
| WO | WO2015007599 A1 | 1/2015 |

\* cited by examiner

METHOD AND APPARATUS FOR ENCODING COLOR MAPPING INFORMATION AND PROCESSING PICTURES BASED ON COLOR MAPPING INFORMATION

CROSS REFERENCES

This application claims the benefit, under 35 U.S.C. § 365 of International Application PCT/EP2016/053585, filed Feb. 19, 2016, which was published in accordance with PCT Article 21(2) on Aug. 25, 2016 in English and which claims the benefit of European patent application No. 15305266.7, filed Feb. 20, 2015.

TECHNICAL FIELD

This invention relates to a method and an apparatus for encoding color mapping information and processing a picture based on color mapping information, and more particularly, to a method and an apparatus for encoding the color mapping information using successive color mapping functions and processing a picture by successively applying color mapping functions.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A sample in a picture may be transformed from one color space to another color space, or more generally, from one color to another color. For example, in scalable video coding, Enhancement Layer (EL) pictures are usually predicted from (possibly upsampled) decoded Base Layer (BL) pictures. When the EL pictures and the BL pictures are represented with different color spaces and/or have been color graded differently, transforming the decoded BL pictures, for example, to the color space of the EL may improve the prediction.

This color transform is also known as color mapping, which may be represented by a Color Mapping Function (CMF). The CMF can for example be approximated by a 3×3 gain matrix plus an offset (Gain-Offset model), which are defined by 12 parameters. However, such an approximation of the CMF may not be very precise because it assumes a linear transform model. In another example, a 3D Look Up Table (also known as 3D LUT), which indicates how a color (usually with three components) is mapped to another color in a look-up table, can be used to describe a CMF. The 3D LUT can be much more precise because its size can be increased depending on the required accuracy. However, a 3D LUT may thus represent a huge data set.

In another example, the color transform can be performed by applying a one-dimensional color LUT independently on each color component of a picture or of a region in the picture. Since applying 1D LUT independently on each color component breaks component correlation, which may decrease the efficiency of the inter-layer prediction and thus the coding efficiency, a linear model such as a 3×3 matrix (in the case of 3 color components) and optionally a vector of offsets can be applied to the mapped components so as to compensate for the decorrelation between the components. Optionally, an additional transform can be performed by applying another one-dimensional color LUT independently on each color component of a picture or of a region in the picture.

SUMMARY

According to an aspect of the present principles, a method for processing a bitstream including a picture is presented, comprising: accessing a first set of parameters indicative of a first color mapping function, the first color mapping function being defined on a first domain; accessing a second set of parameters indicative of a second color mapping function, the second color mapping function being defined on a second domain; and generating an output picture responsive to the first color mapping function, the second color mapping function and the picture, wherein the first color mapping function and the second color mapping function are successively applied to the picture. The present embodiment also provide an apparatus for performing these steps.

The present embodiment also provide a computer readable storage medium having stored thereon instructions for processing a bitstream including a picture according to the methods described above.

According to another aspect of the present principles, a method for encoding color mapping information is presented, comprising: accessing a first color mapping function and a second color mapping function, wherein a successive application of the first color mapping function and the second color mapping function is used to represent the color mapping information; encoding a first set of parameters indicative of the first color mapping function, the first color mapping function being defined on a first domain; encoding a second set of parameters indicative of the second color mapping function, the second color mapping function being defined on a second domain; and providing a bitstream including the first and second sets of parameters as output. The present embodiment also provide an apparatus for performing these steps.

The present embodiment also provide a computer readable storage medium having stored thereon instructions for encoding color mapping information according to the methods described above.

DETAILED DESCRIPTION

Figure 1:
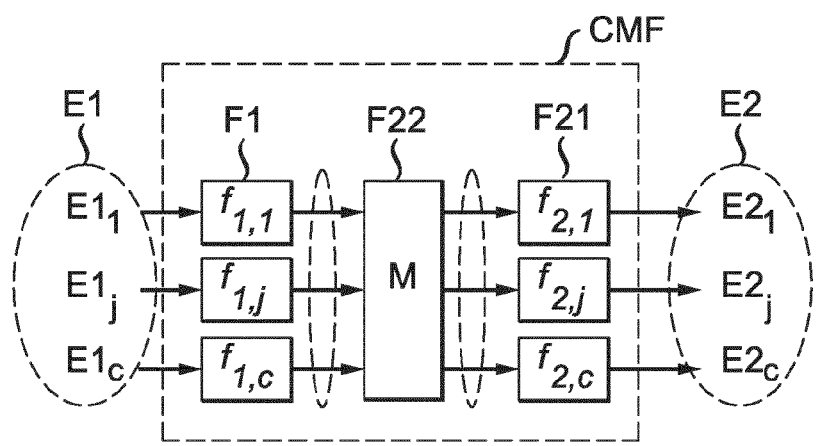
FIG. 1 illustrates a pictorial example of CMF representation using two 1D LUTs and a matrix.

Color transform, also referred to as "color mapping" and "color remapping" in the present application, can be used in a variety of applications. For example, because of the wide range of color formats, of capture capability and of display characteristics, color mapping may be used to render decoded images onto a display device. In another example, a video may be color graded multiple times for different purposes, wherein color grading is a process of altering/enhancing the colors of the video. For instance, a colorist may color grade a movie such that the movie is represented in a wide color gamut (WCG) and has a look for theatres, and another colorist may color grade the movie such that the movie is represented in a smaller gamut and has a look for home entertainment. Each color graded version of the movie corresponds to an artistic intent and may depend on the capabilities of the targeted display or application.

A transmitter may only transmit the home entertainment version and a set of color mapping information, which indicates how colors in the home entertainment version may be mapped to the theatre version. To represent the set of color mapping information, a color mapping function can be determined, in order to minimize the difference between the mapped pictures (e.g., CMF(home entertainment version)) and the target pictures (e.g., the theatre version), for example, using a psycho-visual metric. At the receiver side, the home entertainment version can be mapped to the theatre version using the color mapping information.

Also a transmitter may only transmit the theatre version and a set of color mapping information, which indicates how the colors in the theater version may be mapped to the home entertainment version. At the receiver side, the theatre version can be mapped to the home entertainment version using the color mapping information. Thus, rather than transmitting both versions, only one version can be transmitted, and the other version is recovered using the color mapping information. This approach usually requires much less bandwidth than transmitting both versions, while still preserving the possibility of displaying either version at the display device.

More generally, in order to enable a display device to display either version, metadata representing color mapping information may be signaled in a bitstream. Encoding such color mapping metadata makes it possible to display various versions of the content, and enhance the transmitted coded video if a display is capable of displaying data enhanced by the color mapping information. Transmitting the color mapping information also makes it possible to gracefully degrade a wide color gamut graded content while preserving the artistic intent.

In a draft edition of HEVC (Edition 2 Draft Text of High Efficiency Video Coding (HEVC), JCTVC-R1013, hereinafter "JCTVC-R1013"), color transform information is defined in CRI (Color Remapping Information) as shown in Table 1, with line numbers added in the table for ease of reference. The CRI can be applied to HEVC, HEVC Range Extension, Scalability (SHVC) and Multi-View (MV-HEVC) Extensions. In particular, the color remapping model used in the color remapping information SEI message is composed of a "pre" set of syntax elements, which may be used to construct a first piece-wise linear function applied to each color component, a three-by-three matrix, which may be applied to the three color components, and a "post" set of syntax elements, which may be used to reconstruct a second piece-wise linear function applied to each color component.

TABLE 1

CRI syntax as defined in a draft version of HEVC

| | Descriptor | Line # |
|---|---|---|
| colour_remapping_info( payloadSize ) { | | |
|    colour_remap_id | ue(v) | 1 |
|    colour_remap_cancel_flag | u(1) | 2 |
|    if( !colour_remap_cancel_flag ) { | | 3 |
|      colour_remap_persistence_flag | u(1) | 4 |
|      colour_remap_video_signal_info_present_flag | u(1) | 5 |
|      if( colour_remap_video_signal_info_present_flag ) { | | 6 |
|         colour_remap_full_range_flag | u(1) | 7 |
|         colour_remap_primaries | u(8) | 8 |
|         colour_remap_transfer_function | u(8) | 9 |
|         colour_remap_matrix_coefficients | u(8) | 10 |
|      } | | 11 |
|      colour_remap_input_bit_depth | u(8) | 12 |
|      colour_remap_bit_depth | u(8) | 13 |
|      for( c = 0; c < 3; c++ ) { | | 14 |
|         pre_lut_num_val_minus1[ c ] | u(8) | 15 |
|         if( pre_lut_num_val_minus1[ c ] > 0 ) | | 16 |

TABLE 1-continued

CRI syntax as defined in a draft version of HEVC

| | Descriptor | Line # |
|---|---|---|
|         for( i = 0; i <= pre_lut_num_val_minus1[ c ]; i++ ) { | | 17 |
|            pre_lut_coded_value[ c ][ i ] | u(v) | 18 |
|            pre_lut_target_value[ c ][ i ] | u(v) | 19 |
|         } | | 20 |
|     } | | 21 |
|     colour_remap_matrix_present_flag | u(1) | 22 |
|     if( colour_remap_matrix_present_flag ) { | | 23 |
|         log2_matrix_denom | u(4) | 24 |
|         for( c = 0; c < 3; c++ ) | | 25 |
|            for( i = 0; i < 3; i++ ) | | 26 |
|                colour_remap_coeffs[ c ][ i ] | se(v) | 27 |
|     } | | 28 |
|     for( c = 0; c < 3; c++ ) { | | 29 |
|         post_lut_num_val_minus1[ c ] | u(8) | 30 |
|         if( post_lut_num_val_minus1[ c ] > 0 ) | | 31 |
|            for( i = 0; i <= post_lut_num_val_minus1[ c ]; i++ ) { | | 32 |
|                post_lut_coded_value[ c ][ i ] | u(v) | 33 |
|                post_lut_target_value[ c ][ i ] | u(v) | 34 |
|            } | | 35 |
|         } | | 36 |
|     } | | 37 |
| } | | 38 |

Semantics colour_remap_id contains an identifying number that may be used to identify the purpose of the colour remapping information. The value of colour_remap_id shall be in the range of 0 to $2^{32}-2$, inclusive.

Values of colour_remap_id from 0 to 255 and from 512 to $2^{31}-1$ may be used as determined by the application. Values of colour_remap_id from 256 to 511, inclusive, and from $2^{31}$ to $2^{32}-2$, inclusive are reserved for future use by ITU-T|ISO/IEC. Decoders shall ignore all colour remapping information SEI messages containing a value of colour_remap_id in the range of 256 to 511, inclusive, or in the range of $2^{31}$ to $2^{32}-2$, inclusive, and bitstreams shall not contain such values.

colour_remap_cancel_flag equal to 1 indicates that the colour remapping information SEI message cancels the persistence of any previous colour remapping information SEI message in output order that applies to the current layer. colour_remap_cancel_flag equal to 0 indicates that colour remapping information follows.

colour_remap_persistence_flag specifies the persistence of the colour remapping information SEI message for the current layer.

colour_remap_persistence_flag equal to 0 specifies that the colour remapping information applies to the current picture only.

colour_remap_video_signal_info_present_flag equal to 1 specifies that syntax elements colour_remap_full_range_flag, colour_remap_primaries, colour_remap_transfer_function and colour_remap_matrix_coefficients are present, colour_remap_video_signal_info_present_flag equal to 0 specifies that syntax elements colour_remap_full_range_flag, colour_remap_primaries, colour_remap_transfer_function and colour_remap_matrix_coefficients are not present.

colour_remap_full_range_flag has the same semantics as specified in clause E.3.1 of JCTVC-R1013 for the video_full_range_flag syntax element, except that colour_remap_full_range_flag specifies the colour space of the remapped reconstructed picture, rather than the colour space used for the CLVS (Coded Layer-wise Video Sequence). When not present, the value of colour_remap_full_range_flag is inferred to be equal to the value of video_full_range_flag.

colour_remap_primaries has the same semantics as specified in clause E.3.1 of JCTVC-R1013 for the colour_primaries syntax element, except that colour_remap_primaries specifies the colour space of the remapped reconstructed picture, rather than the colour space used for the CLVS. When not present, the value of colour_remap_primaries is inferred to be equal to the value of colour_primaries.

colour_remap_transfer_function has the same semantics as specified in clause E.3.1 of JCTVC-R1013 for the transfer_characteristics syntax element, except that colour_remap_transfer_function specifies the colour space of the remapped reconstructed picture, rather than the colour space used for the CLVS. When not present, the value of colour_remap_transfer_function is inferred to be equal to the value of transfer_characteristics.

colour_remap_matrix_coefficients has the same semantics as specified in clause E.3.1 of JCTVC-R1013 for the matrix_coeffs syntax element, except that colour_remap_matrix_coefficients specifies the colour space of the remapped reconstructed picture, rather than the colour space used for the CLVS. When not present, the value of colour_remap_matrix_coefficients is inferred to be equal to the value of matrix_coeffs.

colour_remap_input_bit_depth specifies the bit depth of the luma and chroma components or the RGB components of the associated pictures for purposes of interpretation of the colour remapping information SEI message. When any colour remapping information SEI messages is present with the value of colour_remap_input_bit_depth not equal to the bit depth of the coded luma and chroma components or that of the coded RGB components, the SEI message refers to the hypothetical result of a transcoding operation performed to convert the coded video to a converted video with bit depth equal to colour_remap_input_bit_depth.

The value of colour_remap_input_bit_depth shall be in the range of 8 to 16, inclusive. Values of colour_remap_input_bit_depth from 0 to 7, inclusive, and from 17 to 255, inclusive, are reserved for future use by ITU-T|ISO/IEC. Decoders shall ignore all colour remapping SEI messages that contain a colour_remap_input_bit_depth in the range of 0 to 7, inclusive, or in the range of 17 to 255, inclusive, and bitstreams shall not contain such values.

colour_remap_bit_depth specifies the bit depth of the output of the colour remapping function described by the colour remapping information SEI message.

The value of colour_remap_bit_depth shall be in the range of 8 to 16, inclusive. Values of colour_remap_bit_depth from 0 to 7, inclusive, and in the range of 17 to 255, inclusive, are reserved for future use by ITU-T|ISO/IEC. Decoders shall ignore all colour remapping SEI messages that contain a value of colour_remap_bit_depth from 0 to 7, inclusive, or in the range of 17 to 255, inclusive.

pre_lut_num_val_minus1[c] plus 1 specifies the number of pivot points in the piece-wise linear remapping function for the c-th component, where c equal to 0 refers to the luma or G component, c equal to 1 refers to the Cb or B component, and c equal to 2 refers to the Cr or R component. When pre_lut_num_val_minus1[c] is equal to 0, the default end points of the input values are 0 and $2^{colour\_remap\_input\_bit\_depth}-1$, and the corresponding default end points of the output values are 0 and $2^{color\_remap\_bit\_depth}-1$, for the c-th component. In bitstreams conforming to this version of this Specification, the value of pre_lut_num_val_minus1[c] shall be in the range of 0 to 32, inclusive.

pre_lut_coded_value[c][i] specifies the value of the i-th pivot point for the c-th component. The number of bits used to represent pre_lut_coded_value[c][i] is ((colour_remap_input_bit_depth+7)>>3)<<3.

pre_lut_target_value[c][i] specifies the value of the i-th pivot point for the c-th component. The number of bits used to represent pre_lut_target_value[c][i] is ((colour_remap_bit_depth+7)>>3)<<3.

colour_remap_matrix_present_flag equal to 1 indicates that the syntax elements log 2_matrix_denom and colour_remap_coeffs[c][i], for c and i in the range of 0 to 2, inclusive, are present. colour_remap_matrix_present_flag equal to 0 indicates that the syntax elements log 2_matrix_denom and colour_remap_coeffs[c][i], for c and i in the range of 0 to 2, inclusive, are not present.

log 2_matrix_denom specifies the base 2 logarithm of the denominator for all matrix coefficients. The value of log 2_matrix_denom shall be in the range of 0 to 15, inclusive. When not present, the value of log 2_matrix_denom is inferred to be equal to 0.

colour_remap_coeffs[c][i] specifies the value of the three-by-three colour remapping matrix coefficients. The value of colour_remap_coeffs[c][i] shall be in the range of $-2^{15}$ to $2^{15}-1$, inclusive. When colour_remap_coeffs[c][i] is not present, it is inferred to be equal to 1 if c is equal to i, and inferred to be equal to 0 otherwise.

The variable matrixOutput[c] for c=0, 1 and 2 is derived as follows:

roundingOffset=log 2_matrix_denom==0?0:1<<(log 2_matrix_denom−1) matrixOutput[c]=Clip3(0, (1<<colour_remap_bit_depth)−1, (colour_remap_coeffs[c][0]*matrixInput[0]+colour_remap_coeffs[c][1]*matrixInput[1]+colour_remap_coeffs [c][2]*matrixInput[2]+roundingOffset)>>log 2_matrix_denom)

where matrixInput[c] is the input sample value of the c-th colour component, and matrixOutput[c] is the output sample value of the c-th colour component.

post_lut_num_val_minus1[c] has the same semantics as pre_lut_num_val_minus1[c], with pre replaced by post, except that the default end points of the input values are 0 and $2^{colour\_remap\_bit\_depth}-1$ for the c-th colour component. The value of post_lut_num_val_minus1[c] shall be in the range of 0 to 32, inclusive.

post_lut_coded_value[c][i] has the same semantics as pre_lut_coded_value[c][i], with pre replaced by post, except that the number of bits used to represent post_lut_coded_value[c][i] is ((colour_remap_bit_depth+7)>>3)<<3.

post_lut_target_value[c][i] has the same semantics as pre_lut_target_value[c][i], with pre replaced by post.

FIG. 1 illustrates an exemplary CMF representation using two 1D LUTs and a matrix, wherein the input color components $E1_j$ ($j\in\{1, \ldots, C\}$) can be transformed to output color components $E2_j$ ($j\in\{1, \ldots, C\}$), where C is the number of color components of the picture and usually C=3. The color mapping function CMF comprises a transform F1 which is approximated by C one-dimensional piece-wise linear functions $f_{1,j}$ ($j\in\{1, \ldots, C\}$), a second transform F21 which is approximated by C one-dimensional piece-wise linear functions $f_{2,j}$ ($j\in\{1, \ldots, C\}$) and a linear matrix M, which may be considered as being another color transform F22.

Referring back to Table 1, syntax elements pre_lut_num_val_minus1, pre_lut_coded_value and pre_lut_target_value (lines 14-21 in Table 1) can be used to represent the first 1D LUT F1, syntax elements log 2_matrix_denom and colour_remap_coeffs (lines 22-28 in Table 1) can be used to represent matrix M, and syntax elements post_lut_num_val_minus1, post_lut_coded_value and post_lut_target_value (lines 29-36 in Table 1) can be used to represent the second 1D LUT F21.

Figure 2:
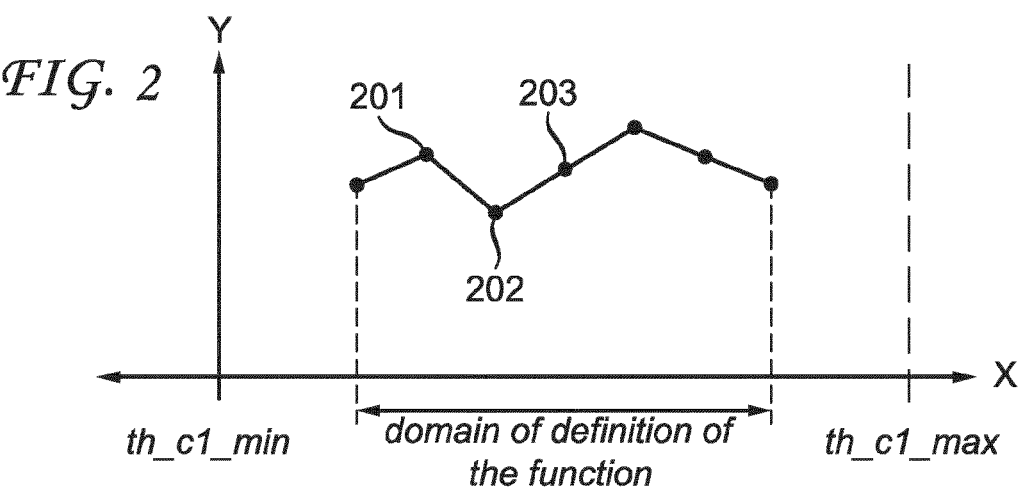
FIG. 2 illustrates a pictorial example of a piece-wise linear curve mapping a color component from value X to value Y.

The HEVC standard defines the parameters for the CMF, but does not mandate the method of reconstructing the CMF. FIG. 2 illustrates a piece-wise linear curve mapping a color component from value X to Y that may be constructed with pivot points, based on the first 1D LUT (the "pre" set of syntax elements). Each pivot point (for example, point 201, 202 or 203) corresponds to a pair of syntax elements (pre_lut_coded_value[c][i], pre_lut_target_value[c][i]), and linear interpolation is used to map values between two pivot points. In FIG. 2, "th_c1_min" is the minimum input value and "th_c1_max" is the maximum input value for color component C1. The values of "th_c1_min" and "th_c1_max" may correspond to the range of a color component in the color space of the video, for example, th_c1_min=0 and th_c1_max=255 for the R component for an 8-bit RGB video, or "th_c1_min" and "th_c1_max" may also correspond to a subset of the color space, for example, th_c1_min=17 and th_c1_max=220.

As shown in FIG. 2, the leftmost pivot point may not be at th_c1_min and the rightmost pivot point may not be at th_c1_max, that is, the piece-wise linear curve may be defined on a subset of the input values. The values on which the piece-wise linear curve is defined are referred to as the domain of definition, or the domain, of the piece-wise linear function.

Figure 3:
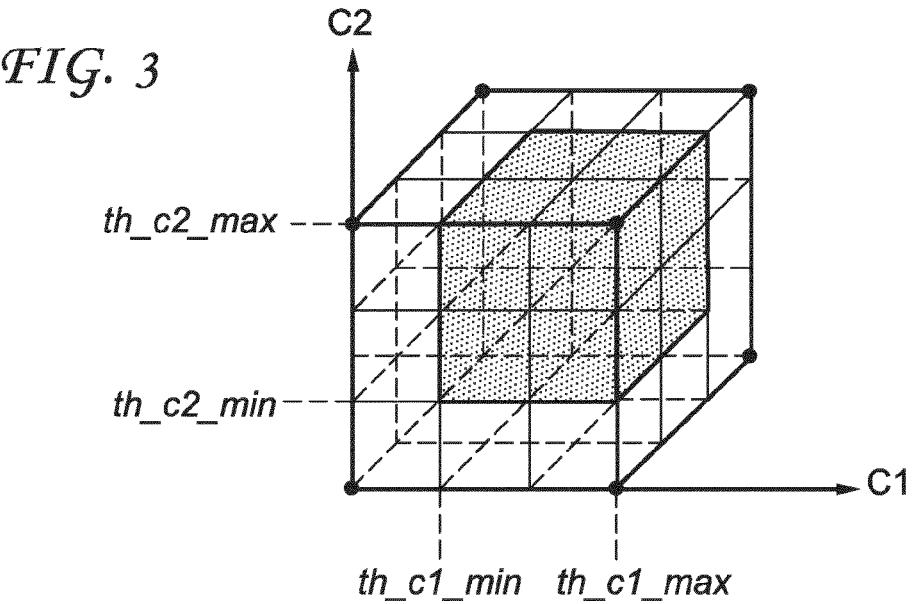
FIG. 3 illustrates a pictorial example where the input colors are in a subset of a color space.

More generally, the color mapping may be defined in the entire color space or a subset of the color space. FIG. 3 shows where the input colors are in a subset of color space, where each axis represents a color component of a color space in which a video signal is represented. The color space has three color components, C1, C2 and C3, for example, R, G and B, respectively. The input colors are defined in the largest cube (the outer cube) [0, th_c1_max]×[0, th_c2_max]×[0, th_c3_max]. In the example of FIG. 3, the CMF is defined in a subset thereof (shaded area [th_c1_min, th_c1_max]×[th_c2_min, th_c2_max]×[th_c3_min, th_c3_max]), i.e., the domain of the color mapping function is a subset of the color space ([0, th_c1_max]×[0, th_c2_max]×[0, th_c3_max]).

Figure 4A:
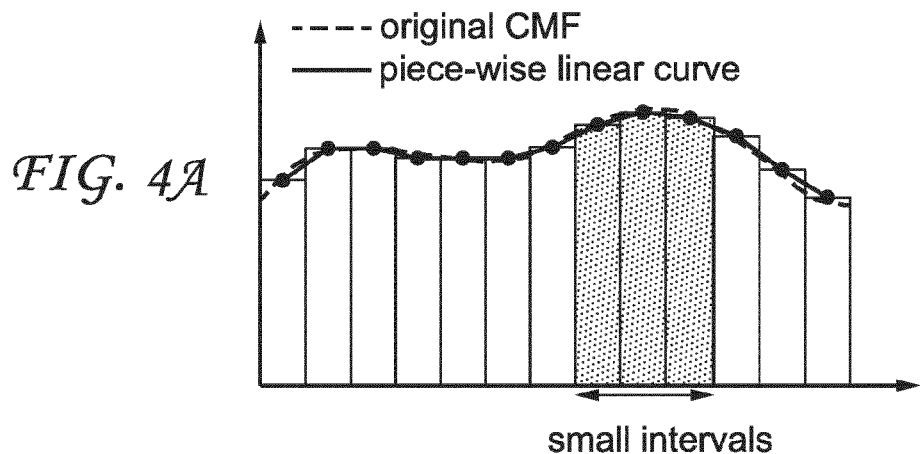
FIG. 4A illustrates a pictorial example of representing a color mapping function using small intervals.
Figure 4B:
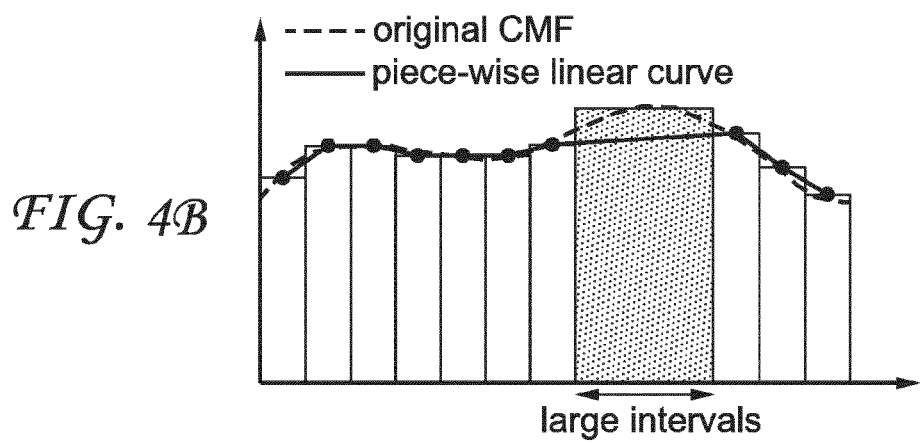
FIG. 4B illustrates another pictorial example of representing a color mapping function using a large interval for some colors.

When the color mapping function is represented using different methods, for example, using 1D LUTs and 3×3 matrix, the accuracy of color mapping may be reduced. For example, FIG. 4A illustrates a simplified example in 1D of using a piece-wise linear curve to represent a color mapping function using equal intervals, and FIG. 4B illustrates another example using different intervals, where the dashed line corresponds to a color mapping function to be represented (denoted as "original CMF") and the solid line corresponds to the piece-wise linear curve used to represent/approximate the original CMF. From FIG. 4A, we observe that the piece-wise linear curve is slightly different from the original CMF. However, as the interval gets larger in some input colors as shown in FIG. 4B, the difference between the piece-wise linear curve and the original CMF becomes large, which may cause color inaccuracy due to the application of the approximated CMF, for example, hue shifts or saturations, which may not occur if the original CMF is used.

Using the HEVC CRI signaling as an example, each of the "pre" set of syntax elements or the "post" set of syntax elements may support up to 33 pivot points (pre_lut_num_val_minus1[c] and post_lut_num_val_minus1[c] are in the range of 0 to 32) in the 1D LUT. In order to represent the color mapping function such that the mapped picture has a good quality (for example, the mapped picture is close to a target picture), selection of the pivot points should usually consider the constraints in the number of pivot points available and the quality of the mapped picture. For example, critical colors, such as colors human eyes are more sensitive to, or of greater statistical importance, should usually get finer representation. Generally, for the critical colors, there should be smaller intervals between pivot points in order to provide a more accurate representation.

However, selecting the pivot points in consideration of statistics and in consideration of the human vision may conflict with each other. For example, we consider an image that includes blue sky (with the values of the B component ranging from 10-63) that corresponds to 95% of the B component and a blue bicycle (with the values of the B component around 56) that correspond to 1% of the B component. A piece-wise linear curve based on statistics may choose to have 32 pivot points at values 10-41 (a pivot point at each value of 10-41) and another pivot point at value 63 such that most samples get a good representation. To map the blue bicycle, the mapping for colors around 56 is interpolated, which may be quite off from the intended mapping. Since the blue bicycle is in the foreground, the distorted blue color in the bike may appear quite pronounced and affect the perceived visual quality.

In another example, we consider an image where there are many red clothes, a red lip and a red nail, where red clothes corresponding to the most samples in the R component, and the red lip and red nail correspond to few samples. Similar to the previous example, pivot points chosen based on statistics cause the colors of red lip/nail to appear brownish, which becomes annoying to human eyes.

In addition to the number of parameters that are available to represent the color mapping function, hardware implementation cost may impose another constraint. We observe that uniform pivot point intervals (i.e., all intervals between two adjacent pivot points have the same distance) in the domain is a preferred hardware implementation. Thus, it is also desirable to consider uniform intervals when designing parameters to represent the color mapping function. For example, when the domain is [0, 1023] for a 10-bit video, the pivot points are at 0, 31, 62, . . . 31*i, . . . , 1023. However, this uniform representation does not provide finer representation for more critical colors, for example, the colors corresponding to skin tones in a picture (for example, 31-62 in B component) may not be mapped very well.

The present principles are directed to a method and apparatus for using multiple color mapping functions to improve the representation of the color mapping information. In particular, we propose different solutions that can provide finer representations for critical colors while also respecting the hardware implementation consideration. Such representation of the color mapping function may be implemented by re-using existing syntax elements. At the decoder side, the color mapping functions can be decoded and then be applied to process a decoded picture. In the following, we use two successive color mapping functions to discuss different embodiments. The present principles can also be applied when more rounds of color mappings are used.

In one embodiment, a first color mapping function can be generated, based on, for example, the color mapping information obtained from two different color gradings. Then an input picture is first mapped using the first color mapping function to form Remap1, for example, one with pivot points at uniform intervals in the domain of definition [0, 1023] in the R component. The remapped picture (Remap1) may have color artifacts because some critical colors are not mapped accurately. Thus, a set of samples may be selected, for example, by an operator manually through a user interface, for further adjustments. The CMF creator generates a second color mapping function for the selected samples (in a different domain of definition, for example, 31-62 for R component). Samples in the input picture corresponding to the selected samples then go through a second color mapping to improve the quality. Subsequently, the mapping result Remap2 from the second CMF which corresponds to the selected samples, and samples from the mapping result Remap1 which correspond to the remaining samples are combined to form the output picture.

Figure 5:
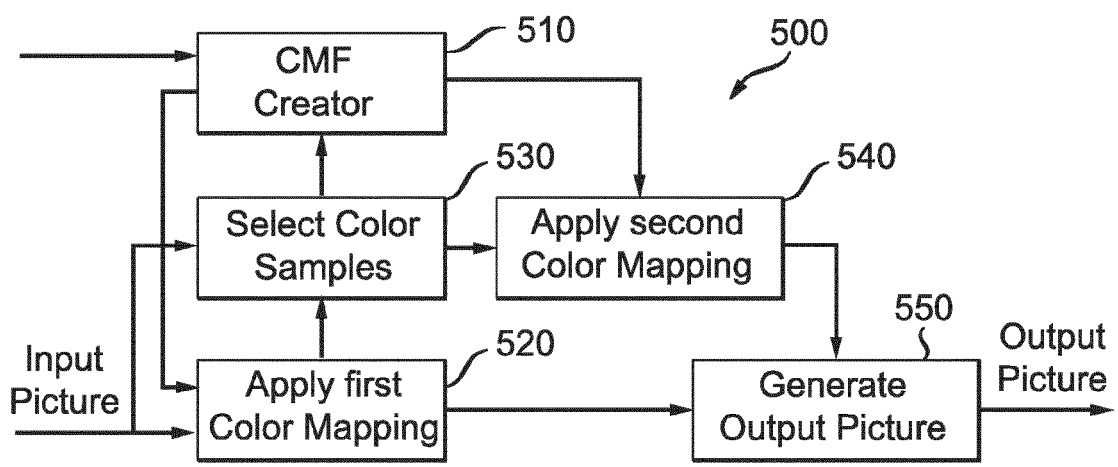
FIG. 5 illustrates a block diagram depicting an exemplary system of creating and applying two color mapping functions, according to an embodiment of the present principles.

In another embodiment, as shown in FIG. 5, after the first color mapping function is applied (520) and the mapped picture (Remap1) is formed, an operator may select (530) samples that have artifacts and need further adjustment. Then the CMF creator generates (510) a second color mapping function for the selected samples. The second color mapping is applied (540) to the samples from the remapped picture (Remap1), rather than samples from the input picture. An output picture can then be generated (550) based on both color mappings.

Figure 6:
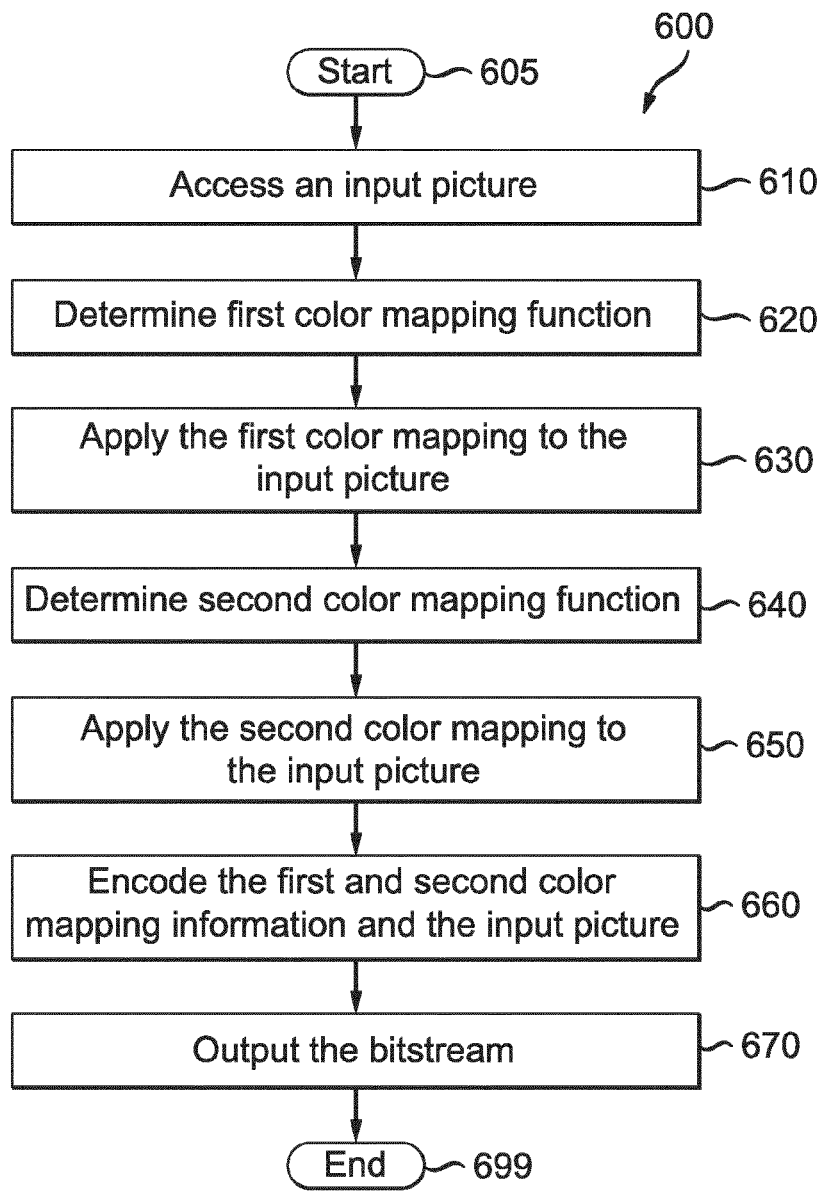
FIG. 6 is a flowchart illustrating an exemplary method for encoding color mapping information, according to an embodiment of the present principles.

FIG. 6 illustrates an exemplary method 600 for encoding color mapping information according to the present principles. Method 600 starts at step 605. At step 610, it accesses an input picture, for example, a WCG HDR (High Dynamic Range) picture. Here the input picture may also be converted from one color space to another one, for example, from YUV to RGB. At step 620, it determines the first color mapping function, for example, based on the color mapping information from two color gradings. Generally, for the color mapping function to be reconstructed at the decoder side, the color mapping function should conform to the format required by the bitstream, for example, the format specified by HEVC CRI syntax elements. At step 630, it applies the first color mapping, for example, it transforms the input picture to a mapped picture (Remap1).

At step 640, it determines a second color mapping function, for example, based on samples selected for further adjustment. At step 650, it applies the second color mapping on the mapped picture (Remap1), for example, it transforms Remap1 to an SDR (Standard Dynamic Range) picture. At step 660, it encodes the first and second color mapping functions and the input picture into a bitstream. At step 670, it outputs the bitstream. Method 600 ends at step 699.

Thus, according to the present embodiments, color mapping functions can be applied successively and one can encode multiple color mapping functions. Correspondingly, color mapping functions can be applied successively to process a picture at the decoder side. When applying the successive color mappings, different rules, for example, as to how the second color mapping function is applied, can be defined. Which rule is to be used can be signaled in the bitstream or known a priori at both the encoder and decoder side. In the following, we discuss two different rules for successive color mappings in further detail.

For ease of notation, we denote the first color mapping as CRI1, and the first color mapping function as $f_{CRI1}$, which is defined on a first domain $D_{CRI1}$, and we denote the second color mapping as CRI2, and the second color mapping function as $f_{CRI2}$, which is defined on a second domain $D_{CRI2}$. Both $D_{CRI1}$ and $D_{CRI2}$ can correspond to the entire possible input colors or a subset thereof. Usually $D_{CRI1}$ and $D_{CRI2}$ are different, for example, $D_{CRI2}$ may be a subset of $D_{CRI1}$, $D_{CRI1}$ and $D_{CRI2}$ may overlap, or $D_{CRI1}$ and $D_{CRI2}$ may not overlap. Function $f_{CRI1}$ or $f_{CRI2}$ may be any color mapping function, for example, those we discussed above. Outside the domains of definition of the color mapping functions, an identity function can be used for color mapping (i.e., the input color is not changed after mapping).

Rule 1

Figure 7:
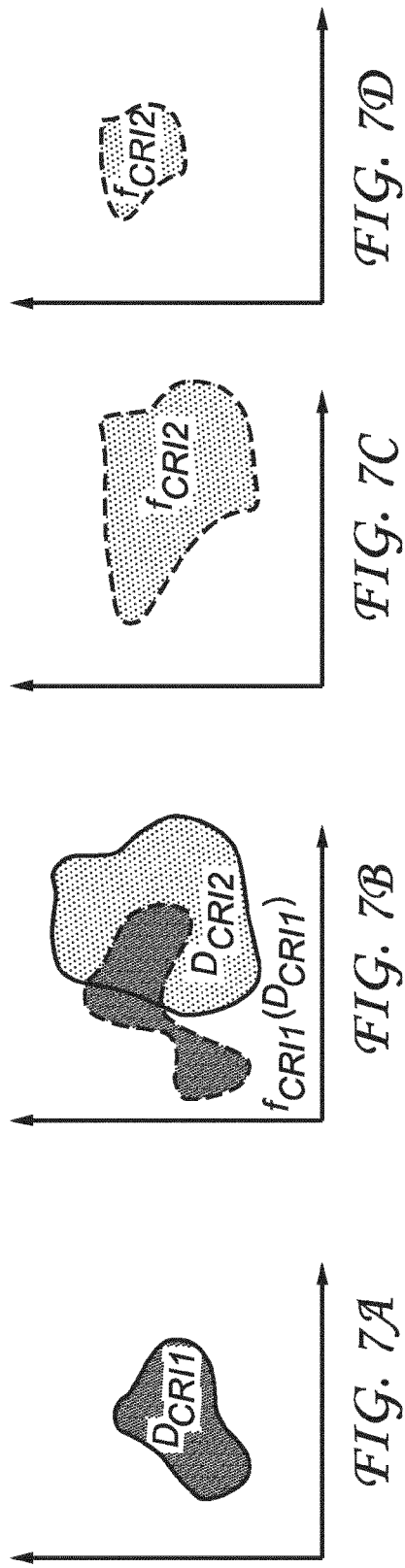
FIG. 7A illustrates an exemplary domain of definition ($D_{CRI1}$) for a first color mapping function $f_{CRI1}$.
FIG. 7B illustrates the range after applying the first color mapping $f_{CRI1}(D_{CRI1})$ within the dashed line and an exemplary domain of definition ($D_{CRI2}$) for a second color mapping function $f_{CRI2}$ within the solid line.
FIG. 7C illustrates the result of the second color mapping on $D_{CRI2}$ according to a first rule.
FIG. 7D illustrates the result of the second color mapping on $D_{CRI2}$ according to a second rule.

In one embodiment, two color mapping functions are consecutively applied on their own domains of definition only. FIG. 7A shows an exemplary domain of definition for the first color mapping function $f_{CRI1}$. The possible color values of the input image are now divided into $D_{CRI1}$ and $\overline{D_{CRI1}}$. The range after applying the first color mapping $f_{CRI1}(D_{CRI1})$ is shown in FIG. 7B within the dashed line. Samples corresponding to $\overline{D_{CRI1}}$ are not changed. Mathematically, the output after CRI1 can be written as a combination of the mapping results from both $D_{CRI1}$ and $\overline{D_{CRI1}}$:

$$\text{Remap1} = f_{CRI1}(D_{CRI1}) \cup \overline{D_{CRI1}}. \quad (1)$$

The domain of the second color mapping function is $D_{CRI2}$, which is shown within the solid line in FIG. 7B. Remap1 is divided into $D_{CRI2}$ and Remap1\$D_{CRI2}$. In FIG. 7B, for simplicity, we assume $\overline{D_{CRI1}}$ covers $D_{CRI2}$, and consequently Remap1 covers $D_{CRI2}$, i.e., Remap1∩$D_{CRI2}$=$D_{CRI2}$. FIG. 7C shows the result of the second color mapping on $D_{CRI2}$, i.e., $f_{CRI2}(D_{CRI2})$. The samples corresponding to colors in Remap1\$D_{CRI2}$ are not changed. Mathematically, the output can be written as a combination of the mapping results from $D_{CRI2}$ and Remap1\$D_{CRI2}$:

$$\text{Remap2} = f_{CRI2}(D_{CRI2}) \cup (\text{Remap1}\backslash D_{CRI2}). \quad (2)$$

When Remap1 does not include the entire $D_{CRI2}$, the second color mapping $f_{CRI2}$ is applied on (Remap1∩$D_{CRI2}$) to be strict, thus, the second color mapping can also be written as $$\text{Remap2} = f_{CRI2}(\text{Remap1} \cap D_{CRI2}) \cup (\text{Remap1}\backslash D_{CRI2}). \quad (3)$$

Rule 2

In another embodiment, the first color mapping CRI1 is applied on its domain of definition, but the second color mapping CRI2 is applied only on samples that have been previously color mapped by CRI1 and which are also inside the domain of definition of function $f_{CRI2}$.

Same as the previous rule, the output after CRI1 can be written as a combination of the mapping results from both $D_{CRI1}$ and $\overline{D_{CRI1}}$:

$$\text{Remap1} = f_{CRI1}(D_{CRI1}) \cup \overline{D_{CRI1}}. \quad (4)$$

The domain of the second color mapping function is $D_{CRI2}$, which is shown within the solid line in FIG. 7B. For simplicity, we also assume Remap1 covers $D_{CRI2}$, and consequently Remap1 covers $D_{CRI2}$, i.e., Remap1∩$D_{CRI2}$=$D_{CRI2}$. However, different from the previous rule, CRI2 is applied only on samples that have been previously color mapped by CRI1 (i.e., samples corresponding to $f_{CRI1}(D_{CRI1})$ in Remap1) and which are also inside the domain of definition of $f_{CRI1}(D_{CRI2})$. FIG. 7D shows the results of the second color mapping on $D_{CRI2}$ for samples that have been previously color mapped by CRI1, i.e., $f_{CRI2}(f_{CRI1}(D_{CRI1}) \cap D_{CRI2})$. The samples corresponding to remaining colors (i.e., Remap1\$D_{CRI2} \cup \overline{D_{CRI1}}$) are not changed by $f_{CRI2}$. That is $$\text{Remap2} = f_{CRI2}(f_{CRI1}(D_{CRI1}) \cap D_{CRI2}) \cup \\ (\text{Remap1}\backslash D_{CRI2}) \cup \overline{D_{CRI1}}. \quad (5)$$

Two different rules for successively applying color transforms are discussed above. Rule 1 can be easier to implement, but affects non-mapped samples (with which the operator may be already satisfied) and may cause new problems. Rule 2 only affects mapped samples so the operator has exact control, but it needs to identify which samples are selected so the implementation is more difficult. Based on the user requirements or other inputs, the encoder may choose one rule over the other one.

In the above, we mainly discussed applying color mappings in a subset of the color space. The present principles can also be applied to a spatial region of the picture. For example, the color mappings can only be applied to a spatial window within the picture. To indicate which spatial region is color mapped, additional syntax elements (xmin, ymin) and (xmax, ymax) can be used to indicate the top-left and bottom-right pixel coordinates of the spatial window, respectively. Or additional syntax elements (xmin, ymin) and (xsize, ysize) can be used to indicate the top-left pixel coordinates and the window size in the number of pixels of the spatial window respectively.

Parameters related to different color mapping functions can be signaled in the bitstream. In one embodiment, several sets of HEVC CRI are encoded in the bitstream before the video coded picture(s) to which it applies (CRI applies to the reconstructed pictures of the same layer (for example, with the same layer_id) the CRI SEI belongs to), in the order that they are applied. In another embodiment, the CRI application order is derived from another syntax element such as colour_remap_id. The present principles can also be applied to other video compression standard that define parameters for color mapping functions.

Figure 8:
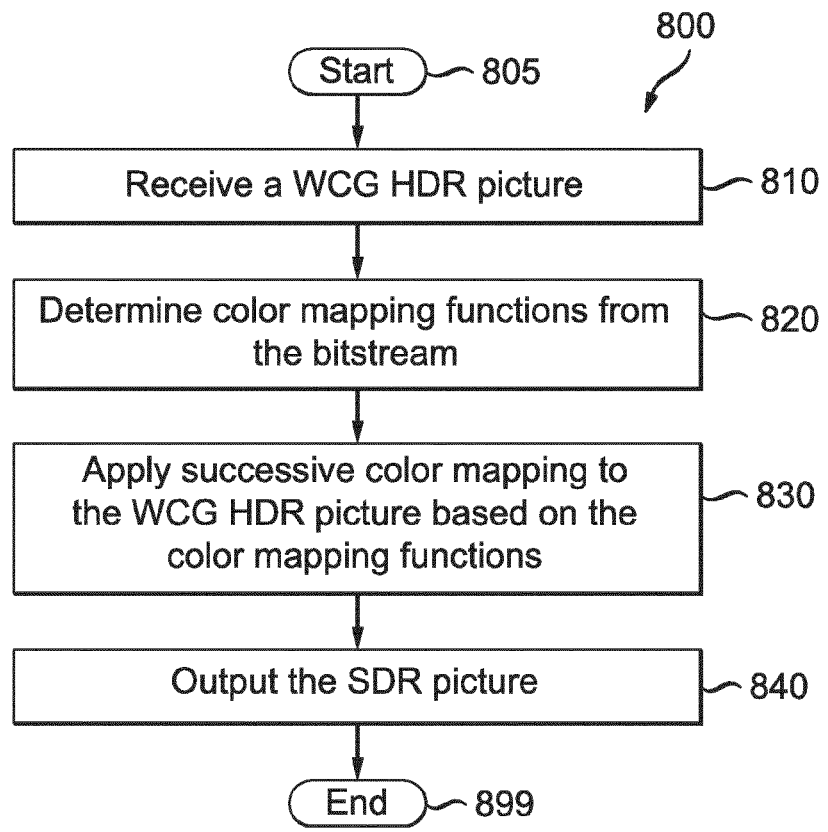
FIG. 8 is a flowchart illustrating an exemplary method for processing a picture based on decoded color mapping functions, according to an embodiment of the present principles.

FIG. 8 illustrates an exemplary method 800 for processing a picture based on decoded color mapping information at the receiver side according to the present principles. Method 800 starts at step 805. At step 810, it receives a WCG HDR picture as input, for example, by decoding the WCG HDR picture from a bitstream. At step 820, it determines parameters for two color mapping functions from the bitstream and their order of application, for example reconstructing piecewise linear curves based on the "pre" and "post" sets of HEVC CRI syntax elements and a 3×3 matrix. At step 830, it performs successive color mappings, for example, it first transforms the WCG HDR picture to a mapped picture using a first color mapping function, and then transforms the mapped picture to an SDR picture using a second color transform function. If the color mapping is performed in a color space different from the color space of input pictures, then the mapped picture should be converted into the color space used for color mapping. At step 840, it outputs the SDR picture. Method 800 ends at step 899.

Figure 9:
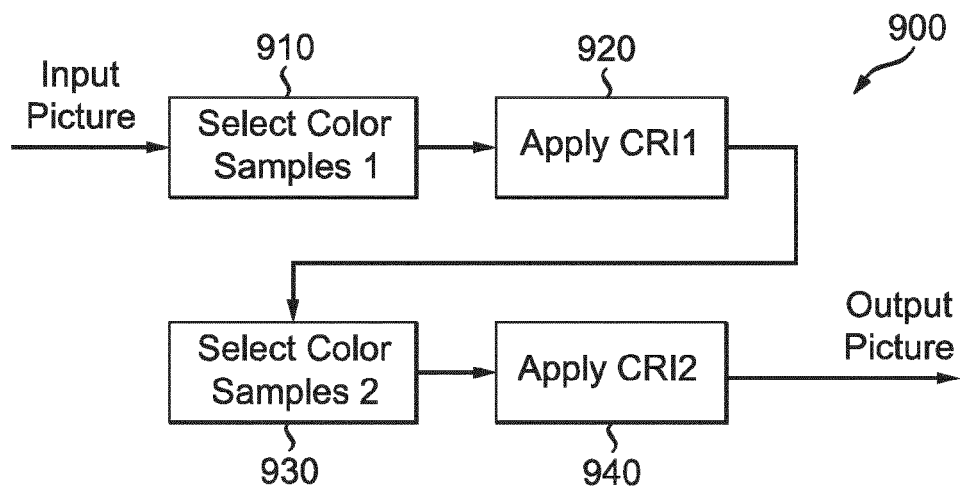
FIG. 9 is a flowchart illustrating an exemplary system of performing the first and second color mappings, according to an embodiment of the present principles.

FIG. 9 illustrates an exemplary method 900 for performing the first and second mappings according to the present principles, which can be used to implement step 830 in method 800. When the first color mapping function is defined on a domain of definition that is a subset of all possible colors, it selects (910) samples that fall within the domain of the first color mapping function. Then the first mapping function is applied (920) to selected samples, and other samples are not changed. After the first mapping function is applied, a mapped picture (Remap1) is formed.

When the second color mapping function is defined on a domain of definition that is a subset of all possible colors, it selects (930) samples that fall within the domain of the second color mapping function from the mapped picture (Remap1). When the second rule as described in Eq. (5) is used, the samples are selected only if they are previously mapped in the first mapping. The second mapping function is applied (940) to the selected samples in Remap1, and other samples are not changed.

In the above, we use WCG HDR and SRD pictures to illustrate the color mappings. The present principles can also be applied to color mappings between other formats of pictures.

Advantageously, the present embodiments can use several color mapping functions in order to capture local variations in the pictures. It may be combined with local spatial window to allow the application of the mappings on the samples inside the local spatial window only. The successive applications of different color mappings also allow for correcting/improving the first color mapping with the subsequent color mapping, without developing more complex color mapping functions, and thereby reducing the implementation costs.

Figure 10:
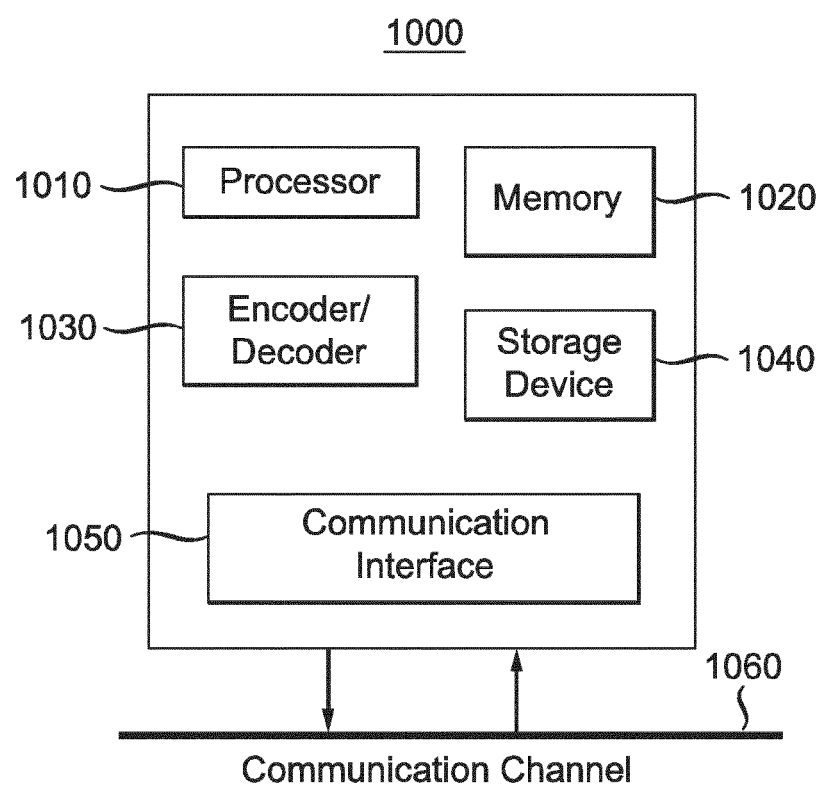
FIG. 10 illustrates a block diagram depicting an exemplary system in which various aspects of the exemplary embodiments of the present principles may be implemented.

FIG. 10 illustrates a block diagram of an exemplary system in which various aspects of the exemplary embodiments of the present principles may be implemented. System 1000 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 1000 may be communicatively coupled to other similar systems, and to a display via a communication channel as shown in FIG. 10 and as known by those skilled in the art to implement the exemplary video system described above.

The system 1000 may include at least one processor 1010 configured to execute instructions loaded therein for implementing the various processes as discussed above. Processor 1010 may include embedded memory, input output interface and various other circuitries as known in the art. The system 1000 may also include at least one memory 1020 (e.g., a volatile memory device, a non-volatile memory device). System 1000 may additionally include a storage device 1040, which may include non-volatile memory, including, but not limited to, EEPROM, ROM, PROM, RAM, DRAM, SRAM, flash, magnetic disk drive, and/or optical disk drive. The storage device 1040 may comprise an internal storage device, an attached storage device and/or a network accessible storage device, as non-limiting examples. System 1000 may also include an encoder/decoder module 1030 configured to process data to provide an encoded video or decoded video.

Encoder/decoder module 1030 represents the module(s) that may be included in a device to perform the encoding and/or decoding functions. As is known, a device may include one or both of the encoding and decoding modules. Additionally, encoder/decoder module 1030 may be implemented as a separate element of system 1000 or may be incorporated within processors 1010 as a combination of hardware and software as known to those skilled in the art.

Program code to be loaded onto processors 1010 to perform the various processes described hereinabove may be stored in storage device 1040 and subsequently loaded onto memory 1020 for execution by processors 1010. In accordance with the exemplary embodiments of the present principles, one or more of the processor(s) 1010, memory 1020, storage device 1040 and encoder/decoder module 1030 may store one or more of the various items during the performance of the processes discussed herein above, including, but not limited to the modulation value, the SDR video, the HDR video, equations, formula, matrices, variables, operations, and operational logic.

The system 1000 may also include communication interface 1050 that enables communication with other devices via communication channel 1060. The communication interface 1050 may include, but is not limited to a transceiver configured to transmit and receive data from communication channel 1060. The communication interface may include, but is not limited to, a modem or network card and the communication channel may be implemented within a wired and/or wireless medium. The various components of system 1000 may be connected or communicatively coupled together using various suitable connections, including, but not limited to internal buses, wires, and printed circuit boards.

The exemplary embodiments according to the present principles may be carried out by computer software implemented by the processor 1010 or by hardware, or by a combination of hardware and software. As a non-limiting example, the exemplary embodiments according to the present principles may be implemented by one or more integrated circuits. The memory 1020 may be of any type appropriate to the technical environment and may be implemented using any appropriate data storage technology, such as optical memory devices, magnetic memory devices, semiconductor-based memory devices, fixed memory and removable memory, as non-limiting examples. The processor 1010 may be of any type appropriate to the technical environment, and may encompass one or more of microprocessors, general purpose computers, special purpose computers and processors based on a multi-core architecture, as non-limiting examples.

Figure 11:
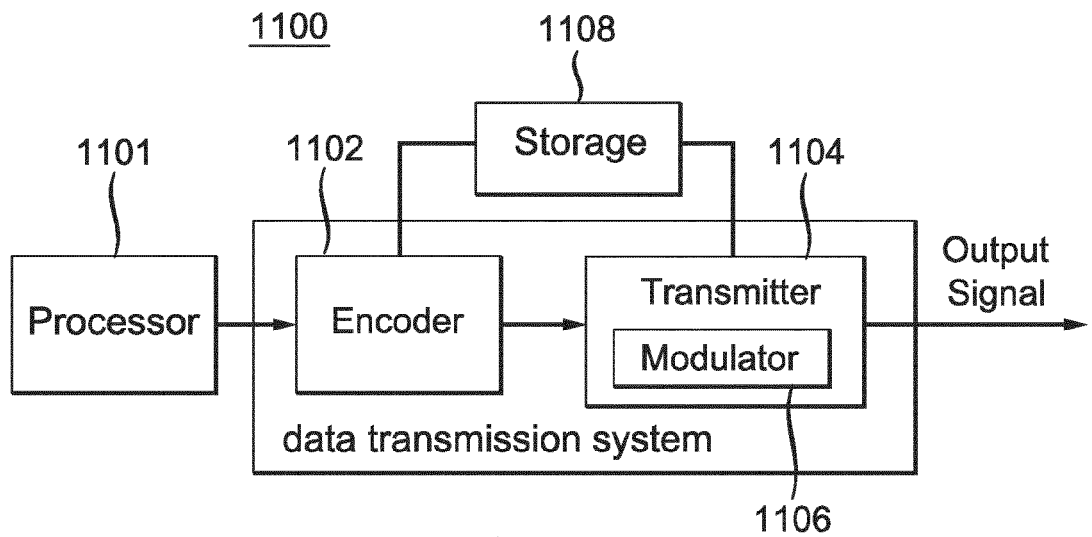
FIG. 11 illustrates a block diagram depicting an example of a video processing system that may be used with one or more implementations.

Referring to FIG. 11, a data transmission system 1100 is shown, to which the features and principles described above may be applied. The data transmission system 1100 may be, for example, a head-end or transmission system for transmitting a signal using any of a variety of media, such as, satellite, cable, telephone-line, or terrestrial broadcast. The data transmission system 1100 also may be used to provide a signal for storage. The transmission may be provided over the Internet or some other network. The data transmission system 1100 is capable of generating and delivering, for example, video content and other content.

The data transmission system 1100 receives processed data and other information from a processor 1101. In one implementation, the processor 1101 generates color mapping information based on two color gradings of the same video and represents the color information using two color mapping functions, for example, using method 500. The processor 1101 may also provide metadata to 1100 indicating, for example, the rule as to how the second color mapping function is applied.

The data transmission system or apparatus 1100 includes an encoder 1102 and a transmitter 1104 capable of transmitting the encoded signal. The encoder 1102 receives data information from the processor 1101. The encoder 1102 generates an encoded signal(s).

The encoder 1102 may include sub-modules, including for example an assembly unit for receiving and assembling various pieces of information into a structured format for storage or transmission. The various pieces of information may include, for example, coded or uncoded video, and coded or uncoded elements. In some implementations, the encoder 1102 includes the processor 1101 and therefore performs the operations of the processor 1101.

The transmitter 1104 receives the encoded signal(s) from the encoder 1102 and transmits the encoded signal(s) in one or more output signals. The transmitter 1104 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 1106. The transmitter 1104 may include, or interface with, an antenna (not shown). Further, implementations of the transmitter 1104 may be limited to the modulator 1106.

The data transmission system 1100 is also communicatively coupled to a storage unit 1108. In one implementation, the storage unit 1108 is coupled to the encoder 1102, and stores an encoded bitstream from the encoder 1102. In another implementation, the storage unit 1108 is coupled to the transmitter 1104, and stores a bitstream from the transmitter 1104. The bitstream from the transmitter 1104 may include, for example, one or more encoded bitstreams that have been further processed by the transmitter 1104. The storage unit 1108 is, in different implementations, one or more of a standard DVD, a Blu-Ray disc, a hard drive, or some other storage device.

Figure 12:
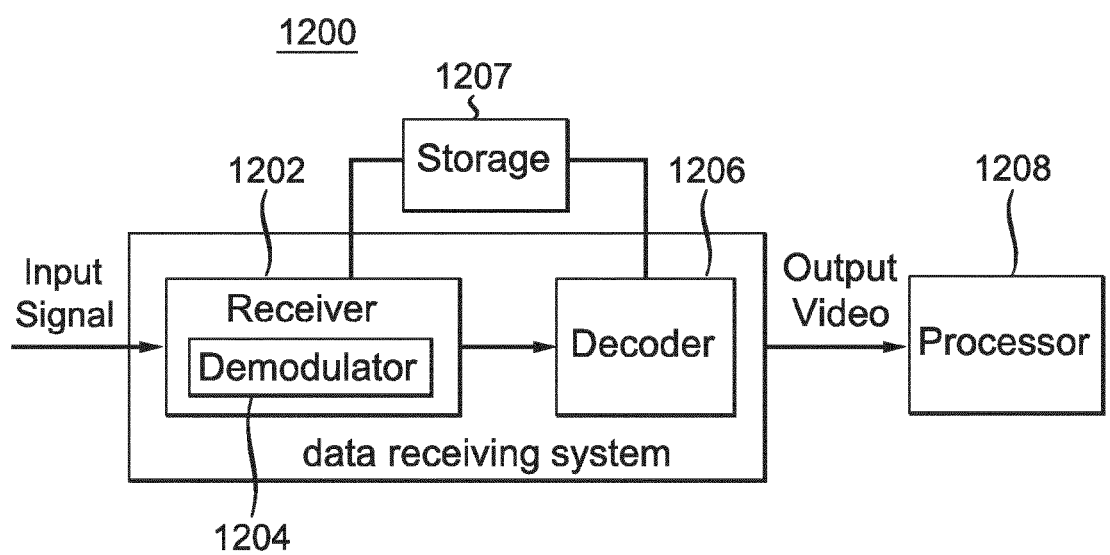
FIG. 12 illustrates a block diagram depicting another example of a video processing system that may be used with one or more implementations.

Referring to FIG. 12, a data receiving system 1200 is shown to which the features and principles described above may be applied. The data receiving system 1200 may be configured to receive signals over a variety of media, such as storage device, satellite, cable, telephone-line, or terrestrial broadcast. The signals may be received over the Internet or some other network.

The data receiving system 1200 may be, for example, a cell-phone, a computer, a set-top box, a television, or other device that receives encoded video and provides, for example, decoded video signal for display (display to a user, for example), for processing, or for storage. Thus, the data receiving system 1200 may provide its output to, for example, a screen of a television, a computer monitor, a computer (for storage, processing, or display), or some other storage, processing, or display device.

The data receiving system 1200 is capable of receiving and processing data information. The data receiving system or apparatus 1200 includes a receiver 1202 for receiving an encoded signal, such as, for example, the signals described in the implementations of this application. The receiver 1202 may receive, for example, a signal providing one or more of a WCG HDR video and color mapping functions, or a signal output from the data transmission system 1100 of FIG. 11.

The receiver 1202 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 1204, de-randomizing the energy in the signal, de-interleaving the data in the signal, and error-correction decoding the signal. The receiver 1202 may include, or interface with, an antenna (not shown). Implementations of the receiver 1202 may be limited to the demodulator 1204.

The data receiving system 1200 includes a decoder 1206. The receiver 1202 provides a received signal to the decoder 1206. The signal provided to the decoder 1206 by the receiver 1202 may include one or more encoded bitstreams. The decoder 1206 outputs a decoded signal, such as, for example, decoded video signals including video information.

The data receiving system or apparatus 1200 is also communicatively coupled to a storage unit 1207. In one implementation, the storage unit 1207 is coupled to the receiver 1202, and the receiver 1202 accesses a bitstream from the storage unit 1207. In another implementation, the storage unit 1207 is coupled to the decoder 1206, and the decoder 1206 accesses a bitstream from the storage unit 1207. The bitstream accessed from the storage unit 1207 includes, in different implementations, one or more encoded bitstreams. The storage unit 1207 is, in different implementations, one or more of a standard DVD, a Blu-Ray disc, a hard drive, or some other storage device.

The output data from the decoder 1206 is provided, in one implementation, to a processor 1208. The processor 1208 is, in one implementation, a processor configured for performing the HDR to SDR mapping based on color mapping information. In some implementations, the decoder 1206 includes the processor 1208 and therefore performs the operations of the processor 1208. In other implementations, the processor 1208 is part of a downstream device such as, for example, a set-top box or a television.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for processing a picture, comprising:
accessing a first color mapping function, input of the first color mapping function being defined on a first subset of a color space, wherein a color mapping function transforms a sample in said picture from one color to another color;
accessing a second color mapping function, input of the second color mapping function being defined on a second subset of said color space, wherein the second subset is different from the first subset of said color space;
applying said first color mapping function to said picture to form a mapped picture;
selecting samples, in said mapped picture, belonging to said second subset of said color space; and
applying said second color mapping function to said selected samples to form an output picture.

2. The method of claim 1, wherein the second subset for the second color mapping function is a subset of the first subset for the first color mapping function.

3. The method of claim 1, further comprising:
selecting samples, in said mapped picture, which are modified by said application of said first color mapping function, wherein the second color mapping function is applied to said selected modified samples.

4. The method of claim 1, wherein each of said first color mapping function and said second color mapping function is represented by a first piece-wise linear function applied to each color component, followed by a three-by-three matrix and a second piece-wise linear function applied to each color component.

5. The method of claim 4, wherein each of said first piece-wise linear function and said second piece-wise linear function has uniform pivot point intervals.

6. A method for encoding color mapping information, comprising:
accessing a first color mapping function and a second color mapping function, wherein a color mapping function transforms a sample in a picture from one color to another color, wherein a successive application of the first color mapping function and the second color mapping function is used to represent the color mapping information, input of said first color mapping function being defined on a first subset of a color space, and input of said second color mapping function being defined on a second subset of said color space, wherein the second subset is different from the first subset of said color space,
wherein said first color mapping function is for applying to said picture to form a mapped picture,
wherein samples, in said mapped picture, belonging to said second subset of said color space are selected, and
wherein said second color mapping function is for applying to said selected samples;
encoding a first set of parameters indicative of the first color mapping function;
encoding a second set of parameters indicative of the second color mapping function; and
providing a bitstream including the first and second sets of parameters as output.

7. The method of claim 6, wherein the second subset of the second color mapping function is a subset of the first subset of the first color mapping function.

8. The method of claim 6, wherein the second color mapping function is only applied to samples that are modified by the application of the first color mapping function.

9. The method of claim 6, wherein the selected samples are used to determine the second color mapping function.

10. The method of claim 6, wherein each of said first color mapping function and said second color mapping function is represented by a first piece-wise linear function applied to each color component, followed by a three-by-three matrix and a second piece-wise linear function applied to each color component.

11. An apparatus for processing a picture, comprising at least one memory and one or more processors, wherein said one or more processors are configured to:
access a first color mapping function, input of the first color mapping function being defined on a first subset of a color space, wherein a color mapping function transforms a sample in said picture from one color to another color;
access a second color mapping function, input of the second color mapping function being defined on a second subset of said color space, wherein the second subset is different from the first subset of said color space;
apply said first color mapping function to said picture to form a mapped picture;

select samples, in said mapped picture, belonging to said second subset of said color space; and apply said second color mapping function to said selected samples to form an output picture.

12. The apparatus of claim 11, wherein the second subset for the second color mapping function is a subset of the first subset for the first color mapping function.

13. The apparatus of claim 11, wherein said one or more processors are further configured to:

select samples, in said mapped picture, which are modified by said application of said first color mapping function, wherein the second color mapping function is applied to said selected modified samples.

14. The apparatus of claim 11, wherein each of said first color mapping function and said second color mapping function is represented by a first piece-wise linear function applied to each color component, followed by a three-by-three matrix and a second piece-wise linear function applied to each color component.

15. The apparatus of claim 14, wherein each of said first piece-wise linear function and said second piece-wise linear function has uniform pivot point intervals.

16. An apparatus for encoding color mapping information, comprising at least one memory and one or more processors, wherein said one more processors are configured to:

access a first color mapping function and a second color mapping function, wherein a color mapping function transforms a sample in a picture from one color to another color, wherein a successive application of the first color mapping function and the second color mapping function is used to represent the color mapping information, input of said first color mapping function being defined on a first subset of a color space, and input of said second color mapping function being defined on a second subset of said color space, wherein the second subset is different from the first subset of said color space, wherein said first color mapping function is for applying to a picture to form a mapped picture, wherein samples, in said mapped picture, belonging to said second subset of said color space are selected, and wherein said second color mapping function is for applying to said selected samples;

encode a first set of parameters indicative of the first color mapping function;

encode a second set of parameters indicative of the second color mapping function; and provide a bitstream including the first and second sets of parameters as output.

17. The apparatus of claim 16, wherein the second subset for the second color mapping function is a subset of the first subset for the first color mapping function.

18. The apparatus of claim 16, wherein the second color mapping function is only applied to samples that are modified by the application of the first color mapping function.

19. The apparatus of claim 16, wherein the selected samples are used to determine the second color mapping function.

20. The apparatus of claim 16, wherein each of said first color mapping function and said second color mapping function is represented by a first piece-wise linear function applied to each color component, followed by a three-by-three matrix and a second piece-wise linear function applied to each color component.

* * * * *